United States Patent [19]
Olson

[11] Patent Number: 5,456,579
[45] Date of Patent: Oct. 10, 1995

[54] WIND TURBINE BLADE WITH GOVERNOR FOR MAINTAINING OPTIMUM ROTATIONAL SPEEDS

[76] Inventor: Timothy G. Olson, 21200 Quail Springs Rd., Tehachapi, Calif. 93561

[21] Appl. No.: 251,321

[22] Filed: May 31, 1994

[51] Int. Cl.[6] ................................. F03D 7/04
[52] U.S. Cl. .................. 416/23; 416/51; 416/DIG. 7
[58] Field of Search .................. 416/23, 24, 44, 416/44 A, 51, 51 A, 52, 52 A, DIG. 7, 223 R; 244/213, 215

[56] References Cited

U.S. PATENT DOCUMENTS

| | | | |
|---|---|---|---|
| 2,372,030 | 3/1945 | Stalker | 416/24 |
| 2,625,997 | 1/1953 | Doak | 416/23 |
| 2,716,460 | 8/1955 | Young | 416/24 |
| 2,776,718 | 1/1957 | Zuck | 416/23 |
| 4,123,198 | 10/1978 | Harbord | 416/223 R |
| 4,565,929 | 1/1986 | Baskin et al. | 416/23 |
| 4,692,095 | 9/1987 | Lawson-Tancred | 416/23 |
| 4,718,821 | 1/1988 | Clancy | 416/44 |

Primary Examiner—Edward K. Look
Assistant Examiner—Christopher Verdier

[57] ABSTRACT

A wind turbine blade with governor for maintaining optimum rotational speeds comprising, in combination: a main body portion with a linear leading edge and a trailing edge, a trailing edge, a tip end and an axis end, the leading edge being linear and fixed and the trailing edge being formed at an angle with respect to the leading edge over the majority of its central extent, the trailing edge being formed with a rectangular recess; and an aileron formed within the recess of the trailing edge of the main body portion with a pivot pin extending through a central extent thereof, the aileron coupled to the main body portion adjacent to the opposed edges of the recess for rotation thereof about an axis parallel with the trailing edge of the main body portion.

2 Claims, 4 Drawing Sheets

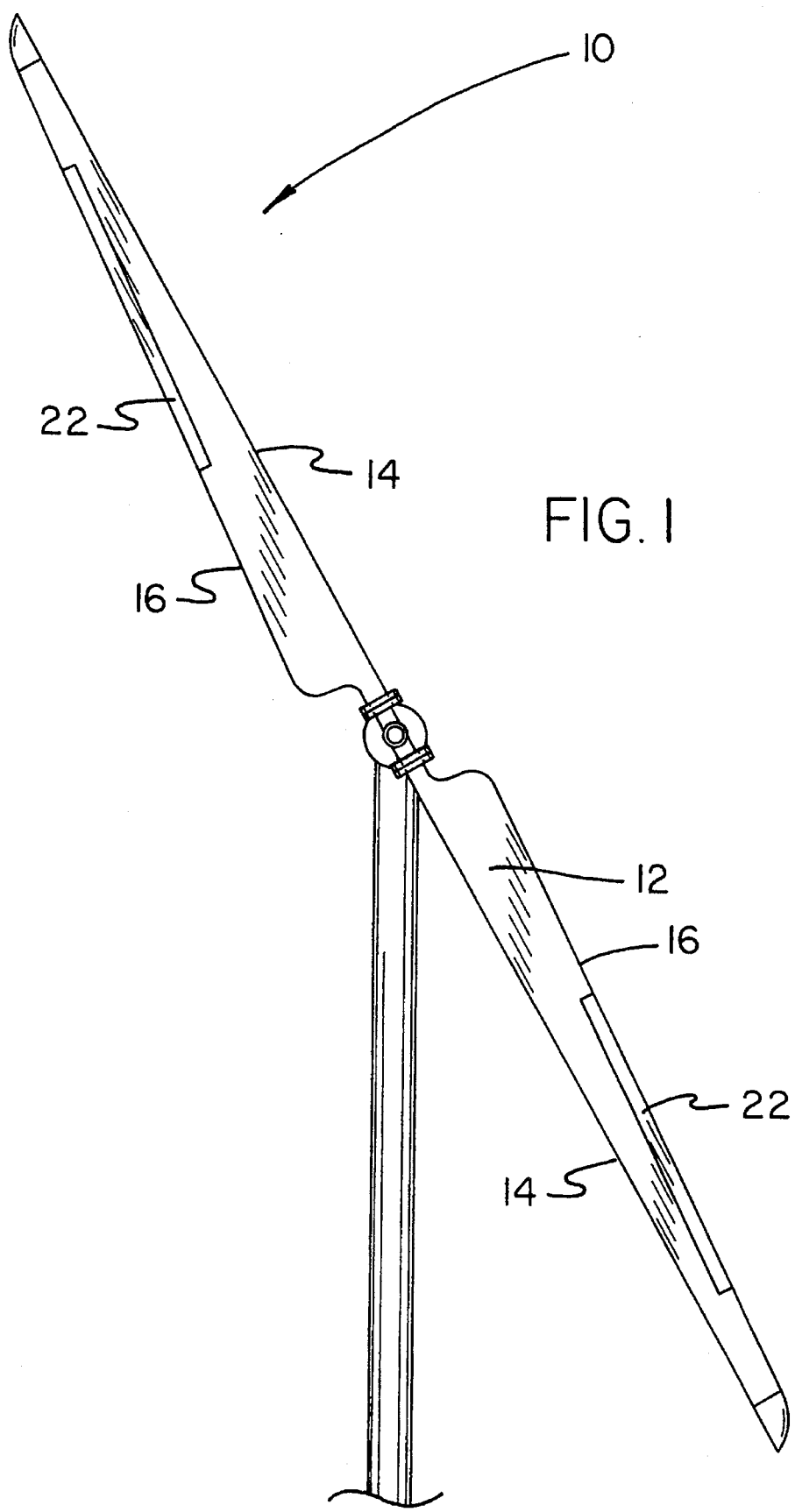

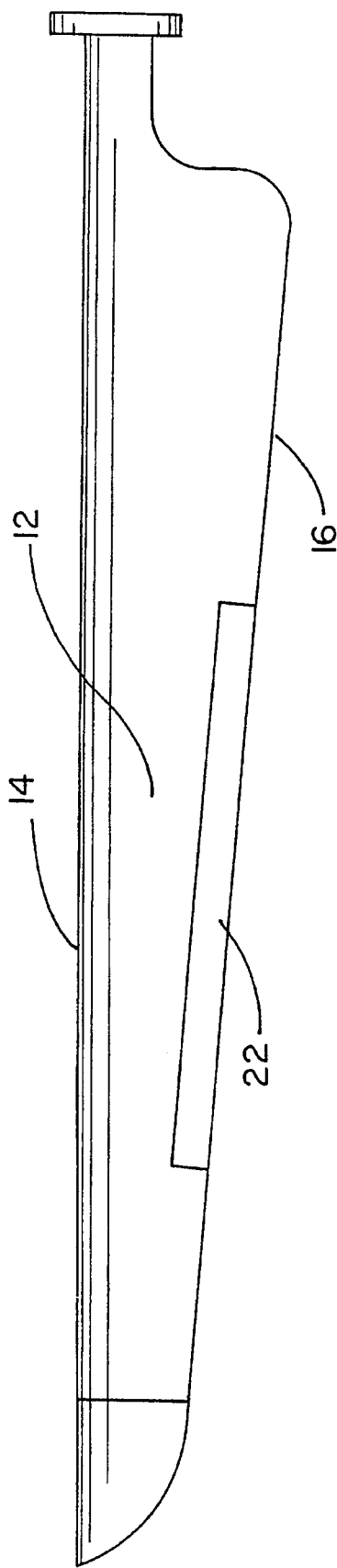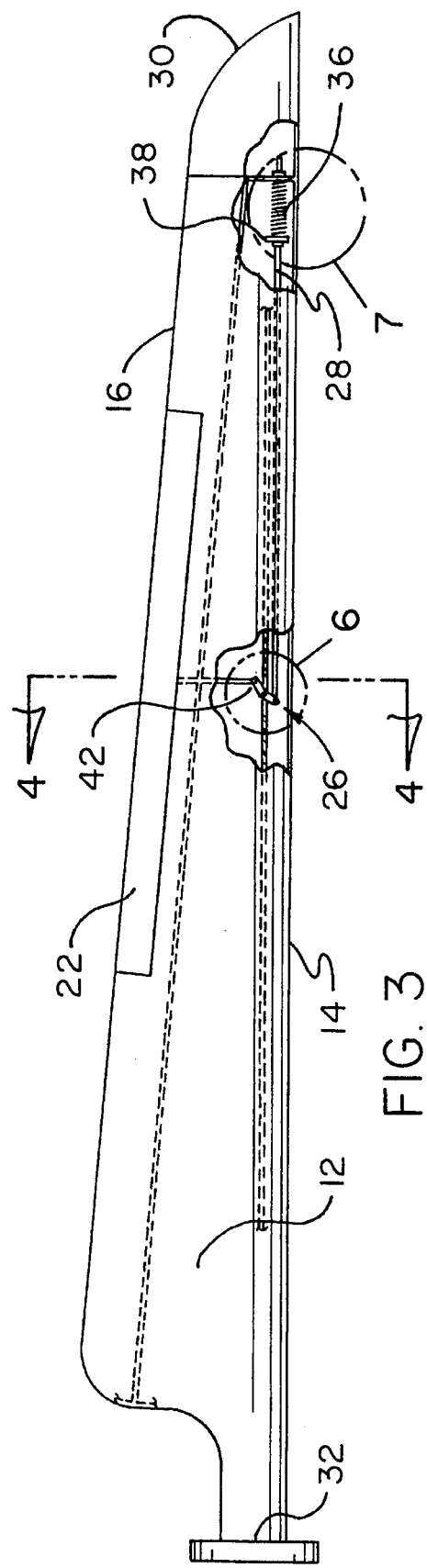

WIND TURBINE BLADE WITH GOVERNOR FOR MAINTAINING OPTIMUM ROTATIONAL SPEEDS

BACKGROUND OF THE INVENTION

1. Field of the Invention

The present invention relates to a wind turbine blade with governor for maintaining optimum rotational speeds and more particularly pertains to maintaining the optimum speeds for wind turbine blades through the use of a governor to vary the aileron positioning as a function of wind speed.

2. Description of the Prior Art

The use of wind turbine blades of various designs is known in the prior art. More specifically, wind turbine blades of various designs heretofore devised and utilized for the purpose of varying the operational characteristics of wind turbine blades and their ailerons through a wide variety of mechanisms are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 5,226,805 to Proven a windmill having blades which alter their pitch angles automatically in response to both wind speed and load.

U.S. Pat. No. 5,159,620 to Bordelon discloses a variable pitch propeller apparatus.

U.S. Pat. No. 5,5028,209 to Vantonen discloses a wind power plant construction.

U.S. Pat. No. 4,720,062 to Warrink discloses an aileron for an airplane wing.

U.S. Pat. No. 4,029,434 to Kenney discloses a variable pitch mounting for airfoil blades of a windmill or propeller.

In this respect, the wind turbine blade with governor for maintaining optimum rotational speeds according to the present invention substantially departs from the conventional concepts and designs of the prior art, and in doing so provides an apparatus primarily developed for the purpose of maintaining the optimum speeds for wind turbine blades through the use of a governor to vary the aileron positioning as a function of wind speed.

Therefore, it can be appreciated that there exists a continuing need for a new and improved wind turbine blade with governor for maintaining optimum rotational speeds which can be used for maintaining the optimum speeds for wind turbine blades through the use of a governor to vary the aileron positioning as a function of wind speed. In this regard, the present invention substantially fulfills this need.

SUMMARY OF THE INVENTION

In view of the foregoing disadvantages inherent in the known types of wind turbine blades of various designs now present in the prior art, the present invention provides an improved wind turbine blade with governor for maintaining optimum rotational speeds. As such, the general purpose of the present invention, which will be described subsequently in greater detail, is to provide a new and improved wind turbine blade with governor for maintaining optimum rotational speeds and method which has all the advantages of the prior art and none of the disadvantages.

To attain this, the present invention essentially comprises a wind turbine blade with governor for maintaining optimum rotational speeds comprising, in combination: a main body portion with a leading edge, a trailing edge, a tip end and an axis end, the leading edge being linear and fixed and the trailing edge being formed at an angle with respect to the leading edge over the majority of its central extent, the trailing edge being formed with a rectangular recess; an aileron formed within the recess of the trailing edge of the main body portion with a pivot pin extending through a central extent thereof, the aileron coupled to the main body portion adjacent to the opposed edges of the recess for rotation thereof about an axis parallel with the trailing edge of the main body portion; and control mechanisms for varying the angular orientation of the aileron as a function of wind speed, the control mechanisms including a rod located adjacent to the tip end of the main body portion with its axis parallel with the leading edge of the main body portion, a coil spring located around the rod and a lead weight at the inboard edge of the spring whereby increased rotational speeds of the main body portion will cause the outboard movement of the weight under the action of the centrifugal force generated by the rotating main body portion, a linkage member adapted for rotation about an axis perpendicular to the axis of the red located at a central extent of the main body portion, the linkage member having a leading end secured to the inboard end of the rod and a trailing end, the trailing end secured to a short rod coupled to the aileron remote from its pivot pin whereby rotational movement of the linkage member in response to rotation of the main body portion will cause rotation of the aileron to a full drag position upon excess winds causing excess movement of the weight outboardly while minimum and no rotational forces on the link will cause the aileron to be in the zero tether orientation.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved wind turbine blade with governor for maintaining optimum rotational speeds which have all the advantages of the prior art wind turbine blades of various designs and none of the disadvantages.

It is another object of the present invention to provide a new and improved wind turbine blade with governor for maintaining optimum rotational speeds which may be easily and efficiently manufactured and marketed.

It is further object of the present invention to provide a new and improved wind turbine blade with governor for maintaining optimum rotational speeds which are of durable and reliable constructions.

An even further object of the present invention is to provide a new and improved wind turbine blade with governor for maintaining optimum rotational speeds which are susceptible of a low cost of manufacture with regard to both materials and labor, and which accordingly are then susceptible of low prices of sale to the consuming public, thereby making such wind turbine blade with governor for maintaining optimum rotational speeds economically available to the buying public.

Still yet another object of the present invention is to provide a new and improved wind turbine blade with governor for maintaining optimum rotational speeds which provide in the apparatuses and methods of the prior art some of the advantages thereof, while simultaneously overcoming some of the disadvantages normally associated therewith.

Still another object of the present invention is to maintain the optimum speeds for wind turbine blades through the use of a governor to vary the aileron positioning as a function of wind speed.

Lastly, it is an object of the present invention to provide a new and improved wind turbine blade with governor for maintaining optimum rotational speeds comprising, in combination: a main body portion with a linear leading edge and a trailing edge, a trailing edge, a tip end and an axis end, the leading edge being linear and fixed and the trailing edge being formed at an angle with respect to the leading edge over the majority of its central extent, the trailing edge being formed with a rectangular recess; and an aileron formed within the recess of the trailing edge of the main body portion with a pivot pin extending through a central extent thereof, the aileron coupled to the main body portion adjacent to the opposed edges of the recess for rotation thereof about an axis parallel with the trailing edge of the main body portion.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational view of a pair of wind turbine blades constructed in accordance with the principles of the present invention.

FIG. 2 is an enlarged front elevational view of one of the blades illustrated in FIG. 1.

FIG. 3 is a view of a wind turbine blade similar to that of FIG. 2 but with parts broken away to show certain internal construction thereof.

The same reference numerals refer to the same parts through the various Figures.

DESCRIPTION OF THE PREFERRED EMBODIMENT

Figure 4:
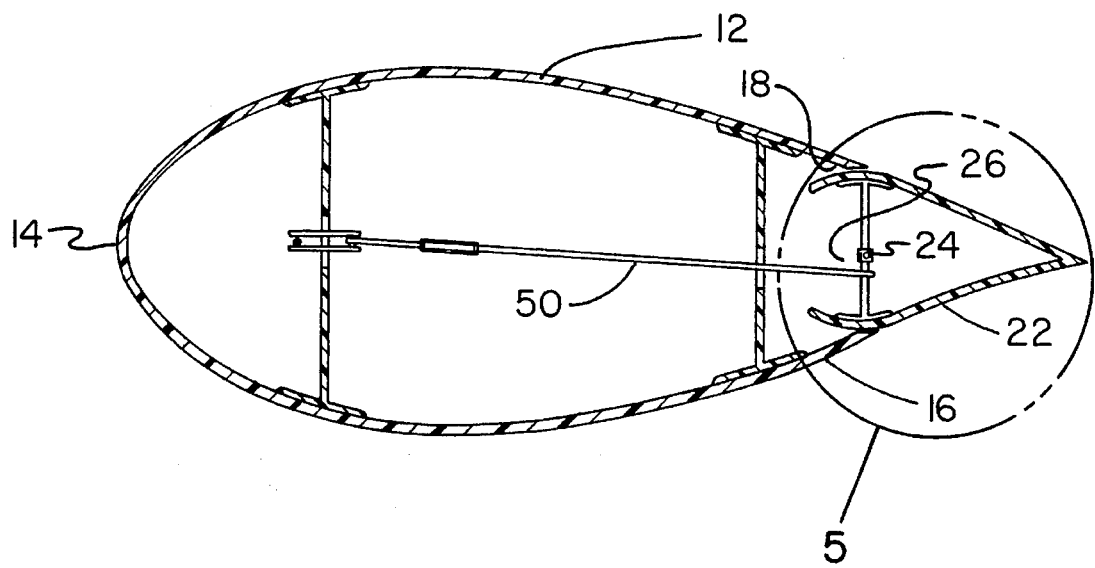
FIG. 4 is a cross sectional view of the wind turbine blade shown in FIG. 3 taken along line 4—4 of FIG. 3.
Figure 5:
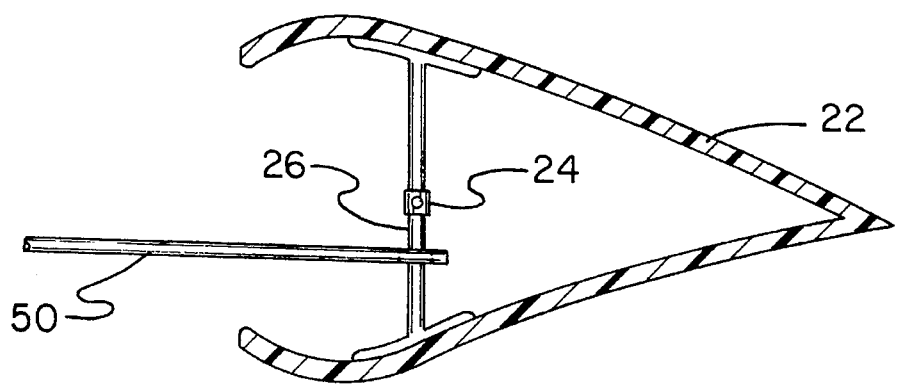
FIG. 5 is an enlarged view of the aileron illustrated in FIG. 4 taken about circle 5 of FIG. 4.
Figure 6:
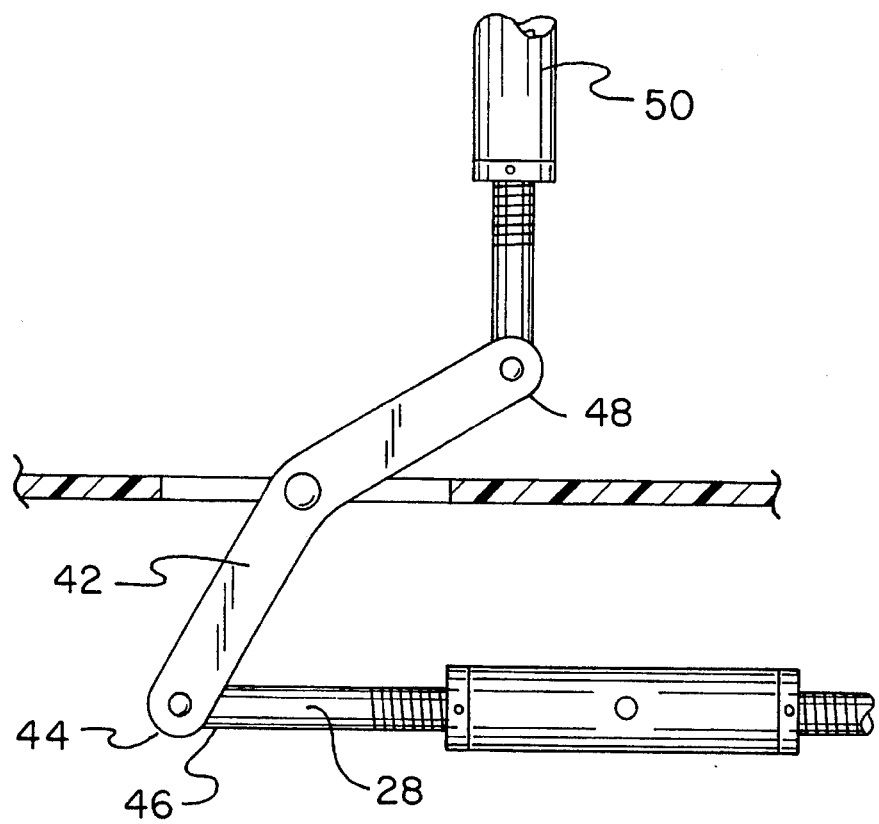
FIG. 6 is an enlarged view of a central portion of the wind turbine blade shown in FIG. 3 taken about 6 of FIG. 3.
Figure 7:
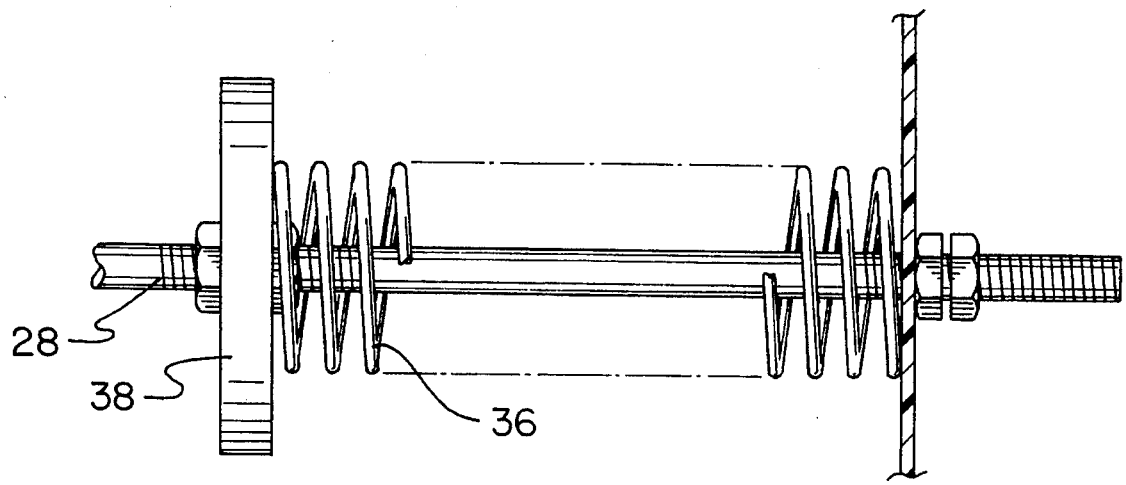
FIG. 7 is an enlarged illustration of a portion of the wind turbine blade shown in the previous Figures taken about circle 7 of FIG. 3.

With reference now to the drawings, and in particular to FIG. 1 thereof, the preferred embodiment of the new and improved wind turbine blade with governor for maintaining optimum rotational speeds embodying the principles and concepts of the present invention and generally designated by the reference numeral 10 will be described.

The invention, the new and improved wind turbine blade with governor for maintaining optimum rotational speeds is comprised of a plurality of components. In their broadest context, such components include an aileron and control mechanisms. Such components are specifically configured and correlated with respect to each other so as to attain the desired objective.

More specifically, the system 10 of the present invention includes a main body portion 12. Such main body portion has a leading edge 14. The leading edge is linear and fixed. The main body portion also has a trailing edge 16. The trailing edge is formed at an angle with respect to the leading edge over the majority of its central extent. The trailing edge is formed with a rectangular recess 18.

The next component of the system is an aileron 22. The aileron is formed within the recess of the trailing edge of the main body portion. It has a pivot pin 24 extending through a central extent thereof. The aileron is coupled to the main body portion adjacent to the opposed edges of the recess. This is for rotation of the aileron about an axis parallel with the trailing edge of the main body portion. Next provided are the control mechanisms 26 for movement of the aileron with respect to the main body portion. The control mechanisms function through varying the angular orientation of the aileron as a function of the wind speed. More specifically, the control mechanisms include a rigid rod 28. Such rigid rod is located adjacent to the tip end 30 of the main body portion. The tip end is opposite from the axis end 32 of the main body portion. The axis of the rod is parallel with the leading edge of the main body portion.

In association with the rod, a coil spring 36 is located around the rod adjacent to the tip end. Inboardly of the tip end and spring is a heavy weight 38. Such heavy weight is preferably made of lead. It is located at the inboard edge of the spring and coupled thereto whereby increased rotation of speeds of the main body portion will cause the weight to move outboardly under the action of centrifugal force as generated by the rotation of the main body portion.

A linkage member 42 is adapted for rotation about an axis perpendicular to the axis of the rod. The linkage member is located at a central extent of the main body portion. Such linkage member has a leading end 44 secured to the inboard end 46 of the rod. The linkage also has a trailing end 48. The trailing end is secured to a short rod 50. The short rod is coupled to the aileron at a location remote from its pivot pin. In this manner, rotational movement of the linkage member in response to rotation of the main body portion will cause rotation of the aileron. Such rotation will be to a full drag position upon excess winds causing excess movement of the weight outboardly. Conversely, minimum or no rotational forces on the link will cause the aileron to be in a zero tether orientation as shown in FIG. 4.

The present invention is a cost effective wind turbine blade that is capable of generating more power on a relatively low wind speed day. A lot of wind turbines currently in use don't produce optimum power output on these days. Another problem is the use of materials that are prone to tip breakage in the manufacture of the blades. To replace the blade and get the turbine back on line can take as long as three hours and can be costly in lost time, power and spare parts. The present invention solves these problems.

The innovative blade design utilizes a single aileron operated by a centrifugal force mechanism. It features a high strength Kevlar outer skin and a core of high density Rohacell, which is backed up by a unidirectional fiberglass layup. The interstringers are made with Kevlar that is would with carbon fibers for increased flexibility and strength.

The key to the improved operation of this system is the lead weight governor installed at its tip. The weight is mounted on a push-pull rod along with a tension spring and a nut for adjusting the spring and weight. The rod is also connected to a bell crank that adjust the position of the aileron.

The aileron is set to rest in full lift position by setting a predetermined tension on the lead weight-spring assembly with the adjusting nut. As the turbine rotates faster, centrifugal force pushes the lead weight out, thereby compressing the tension spring and pulling on the rod and bell crank. This moves the aileron to a lower lift position, thus slowing down the turbine. With the velocity reduced, the spring returns the weight to its original position, thereby adjusting the aileron as well. There is no need for the turbine to stop. The present invention could be available for both new and already existing systems.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved wind turbine blade with governing capabilities for maintaining optimum rotational speeds comprising, in combination:

a main body portion with a leading edge, a trailing edge, a tip end and an axis end with a central extent therebetween, the leading edge being linear and fixed and the trailing edge being formed at an angle with respect to the leading edge over the majority of its central extent, the trailing edge being formed with a rectangular recess with opposed edges;

an aileron formed within the recess of the trailing edge of the main body portion with a pivot pin extending through a central extent thereof, the aileron coupled to the main body portion adjacent to the opposed edges of the recess for rotation thereof about an axis parallel with the trailing edge of the main body portion; and control mechanisms for varying the angular orientation of the aileron as a function of wind speed, the control mechanisms including a rod having an inboard end and an outboard end located adjacent to the tip end of the main body portion with its axis parallel with the leading edge of the main body portion, a coil spring with an inboard edge and an outboard edge located around the rod and a lead weight at the inboard edge of the spring whereby increased rotational speeds of the main body portion will cause movement of the weight toward the tip end when centrifugal force is generated by the rotation of the main body portion, a linkage member adapted for rotation about an axis perpendicular to the axis of the rod located at a central extent of the main body portion, the linkage member having a leading end secured to the inboard end of the rod and a trailing end, the trailing end secured to a supplemental rod coupled to the aileron remote from its pivot pin whereby rotational movement of the linkage member in response to rotation of the main body portion will cause rotation of the aileron to a full drag position upon excess winds causing excess movement of the weight outboardly while minimum and no rotational forces on the link will cause the aileron to be in an orientation for zero tether.

2. A wind turbine blade with governing capabilities for maintaining optimum rotational speeds comprising, in combination:

a main body portion with a linear leading edge and a trailing edge with a central extent therebetween, a tip end and an axis end, the leading edge being linear and fixed and the trailing edge being formed at an angle with respect to the leading edge over the majority of its central extent, the trailing edge being formed with a rectangular recess with opposed edges;

an aileron formed within the recess of the trailing edge of the main body portion with a pivot pin extending through a central extent thereof, the aileron coupled to the main body portion adjacent to the opposed edges of the recess for rotation thereof about an axis parallel with the trailing edge of the main body portion; and control mechanisms including a rod located adjacent to the tip end of the main body portion with its axis parallel with the leading edge of the main body portion, a coil spring having an inboard edge and an outboard edge located around the rod and a weight at the inboard edge of the spring whereby increased rotation speeds of the main body portion will cause the movement of the weight toward the tip end when centrifugal force is generated by the rotating main body portion, a linkage member adapted for rotation about an axis perpendicular to the axis of the rod located at a central extent of the main body portion, the linkage member having a leading end secured to the inboard end of the rod and a trailing end, the trailing end secured to a supplemental rod coupled to the aileron remote from its pivot pin.

* * * * *